US012770338B2

(12) United States Patent
Zhao et al.

(10) Patent No.: US 12,770,338 B2
(45) Date of Patent: Oct. 20, 2026

(54) VISUALLY COHERENT LIGHTING FOR MOBILE AUGMENTED REALITY

(71) Applicant: Worcester Polytechnic Institute, Worcester, MA (US)

(72) Inventors: Yiqin Zhao, Sunnyvale, CA (US); Tian Guo, North Grafton, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 116 days.

(21) Appl. No.: 18/237,095

(22) Filed: Aug. 23, 2023

(65) Prior Publication Data

US 2024/0071009 A1 Feb. 29, 2024

Related U.S. Application Data

(60) Provisional application No. 63/400,531, filed on Aug. 24, 2022.

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2207/10024* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 11,043,025 | B2 | 6/2021 | Praksh et al. | |
| 2016/0026253 | A1 | 1/2016 | Bradski et al. | |
| 2019/0318177 | A1* | 10/2019 | Steinberg | G01S 17/931 |
| 2020/0302686 | A1 | 9/2020 | Totty et al. | |
| 2021/0407142 | A1 | 12/2021 | Hur et al. | |

OTHER PUBLICATIONS

International Search Report and Written Opinion in related PCT Application No. PCT/US23/30888 mailed on Feb. 20, 2024.

* cited by examiner

*Primary Examiner* — Robert J Craddock
(74) *Attorney, Agent, or Firm* — Duquette Law Group

(57) ABSTRACT

In a mobile computerized device, a method for generating visually coherent lighting for mobile augmented reality comprises capturing a set of near-field observations and a set of far-field observations of an environment; generating an environment map based upon the set of near-field observations of the environment and the set of far-field observations of the environment; applying the environment map to a virtual object to render a visually-coherent virtual object; and displaying an image of the environment and the visually-coherent virtual object within the environment on a display of the mobile computerized device.

18 Claims, 9 Drawing Sheets

VISUALLY COHERENT LIGHTING FOR MOBILE AUGMENTED REALITY

RELATED APPLICATIONS

This patent application claims the benefit of U.S. Provisional Application No. 63/400,531, filed on Aug. 24, 2022, entitled, "Visually Coherent Lighting System for Mobile Augmented Reality," the contents and teachings of which are hereby incorporated by reference in their entirety.

GOVERNMENT LICENSE RIGHTS

This invention was made with government support under Grant #CNS-1815619 awarded by the National Science Foundation and under Grant #NGSDI-2105564 awarded by the National Science Foundation. The government has certain rights in the invention.

BACKGROUND

Augmented reality allows end-users to experience a real-world environment in combination with computer-generated visual or audio elements. With the increased usage of mobile computerized devices, such as mobile phones or tablets, mobile augmented reality (AR) applications have been developed to utilize the hardware components of the mobile device to deliver augmented-reality functions.

Mobile AR has attracted increasing interest from developers to better engage users by allowing seamless integration of physical and virtual environments. For example, given the interactive nature of AR applications, users often prefer virtual objects of high visual quality. Virtual objects rendered by the mobile device should appear realistic to the end-user and feel like they belong to the physical surroundings, a property commonly referred to as visual coherence. For example, virtual sunglasses that are overlaid on a user's face should appear as realistic physical sunglasses by reflecting the correct physical environment (i.e., the virtual sunglasses should appear visually coherent).

To achieve both realistic and visually coherent rendering, mobile AR applications typically utilize omnidirectional environment lighting at the user-specified rendering position. An accurate understanding of omnidirectional environment lighting is crucial for high-quality virtual object rendering in mobile augmented reality (AR). In particular, to support reflective rendering, existing methods have leveraged deep learning models to estimate or have used physical light probes to capture physical lighting, typically represented in the form of an environment map.

SUMMARY

Conventional methods for supporting reflective rendering in augmented reality suffer from a variety of deficiencies.

As provided above, for mobile AR applications, an environment map is typically utilized for image-based lighting. However, obtaining a high-quality environment map for mobile AR has several challenges. First, the inherent spatial variation of indoor environment lighting makes the environment map at an observation position a poor approximation of the rendering position environment map. Second, the natural user mobility of mobile AR usage can induce noise to necessary data, such as 6DoF tracking and RGB image data, for lighting estimation. For example, tracking data provided by the commercial framework ARKit (Apple Inc., One Apple Park Way, Cupertino, CA) can show misalignment of consecutive camera frames even though those frames represent the same physical space. As such, the corresponding reflective rendering may not match the physical environments. Third, mobile devices can have heterogeneous sensing capability, such as in terms of the camera's field-of-view (FoV) or ability to sense depth, which can result in inaccurate lighting estimates. Fourth, mobile devices have relatively limited hardware resources compared to desktop computerized devices. Since the interactive nature of AR typically requires 30 fps rendering, the hardware or computational limitation of conventional mobile devices makes it challenging to directly use computational-intensive models designed to run on powerful servers. As such, conventional mobile AR applications are configured to optimize or minimally utilize time-consuming operations, which can limit the quality of the environment map utilized for mobile AR applications.

By contrast to conventional reflective rendering methodologies, embodiments of the present innovation relate to a visually coherent lighting for mobile augmented reality. In one arrangement, a computerized device, such as a mobile computerized device, having a controller, such as a memory and a processor, is configured to execute a lighting reconstruction framework that enables realistic and visually-coherent rendering for mobile augmented reality applications. For example, during operation, the mobile computerized device is configured to execute a two-field lighting reconstruction engine, which generates high-quality environment maps from mobile cameras with limited field of vision (FoV). Each environment map includes near-field and far-field portions, separately constructed from near-field and far-field observations. The resulting environment map captures spatial and directional variances and is suitable for reflective rendering of a virtual object by the mobile computerized device.

As a result, the mobile computerized device can generate photorealistic images of a virtual object in augmented reality and can provide the user with an immersive experience. The mobile computerized device provides visually coherent lighting estimation for mobile AR, which was not achievable previously without physical probe setups.

In one arrangement, the mobile computerized device is configured to address mobility-induced noise, limited mobile sensing capabilities, and the computation intensity that naturally arises during the lighting reconstruction process. For example, the mobile computerized device can be configured to execute multi-resolution projection and anchor extrapolation techniques that efficiently project the intermediate three-dimensional point clouds to the final two dimensional environment maps. These techniques provide high data input quality, good usability, and low reconstruction time.

In one arrangement, the mobile computerized device is configured to implement the lighting reconstruction framework as an edge-assisted system. The edge-assisted system can achieve between about 36.7%-44.1% higher peak signal-to-noise ratio (PSNR) values on objects with various geometries and materials than conventional frameworks. The edge-assisted system can generate high-quality lighting roughly at 22 fps and can support dynamic scenes effectively, compared to conventional frameworks.

Arrangements of the innovation relate to, in a mobile computerized device, a method for generating visually coherent lighting for mobile augmented reality comprising capturing a set of near-field observations and a set of far-field observations of an environment; generating an environment map based upon the set of near-field observations of the environment and the set of far-field observations of the environment; applying the environment map to a virtual object to render a visually-coherent virtual object; and displaying an image of the environment and the visually-coherent virtual object within the environment on a display of the mobile computerized device.

Arrangements of the innovation relate to a mobile computerized device, comprising a controller having a processor and a memory; a camera system disposed in electrical communication with the controller; and a display disposed in electrical communication with the controller. The controller is configured to capture a set of near-field observations and a set of far-field observations of an environment; generate an environment map based upon the set of near-field observations of the environment and the set of far-field observations of the environment; apply the environment map to a virtual object to render a visually-coherent virtual object; and display an image of the environment and the visually-coherent virtual object within the environment on the display of the mobile computerized device.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a visually coherent lighting for mobile augmented reality. In one arrangement, a computerized device, such as a mobile computerized device, having a controller, such as a memory and a processor, is configured to execute a lighting reconstruction framework that enables realistic and visually-coherent rendering for mobile augmented reality applications. For example, during operation, the mobile computerized device is configured to execute a two-field lighting reconstruction engine, which generates high-quality environment maps from mobile cameras with limited field of vision (FoV). Each environment map includes near-field and far-field portions, separately constructed from near-field and far-field observations. The resulting environment map captures spatial and directional variances and is suitable for reflective rendering of a virtual object by the mobile computerized device. As a result, the mobile computerized device can generate photorealistic images of a virtual object in augmented reality and can provide the user with an immersive experience.

Figure 1:
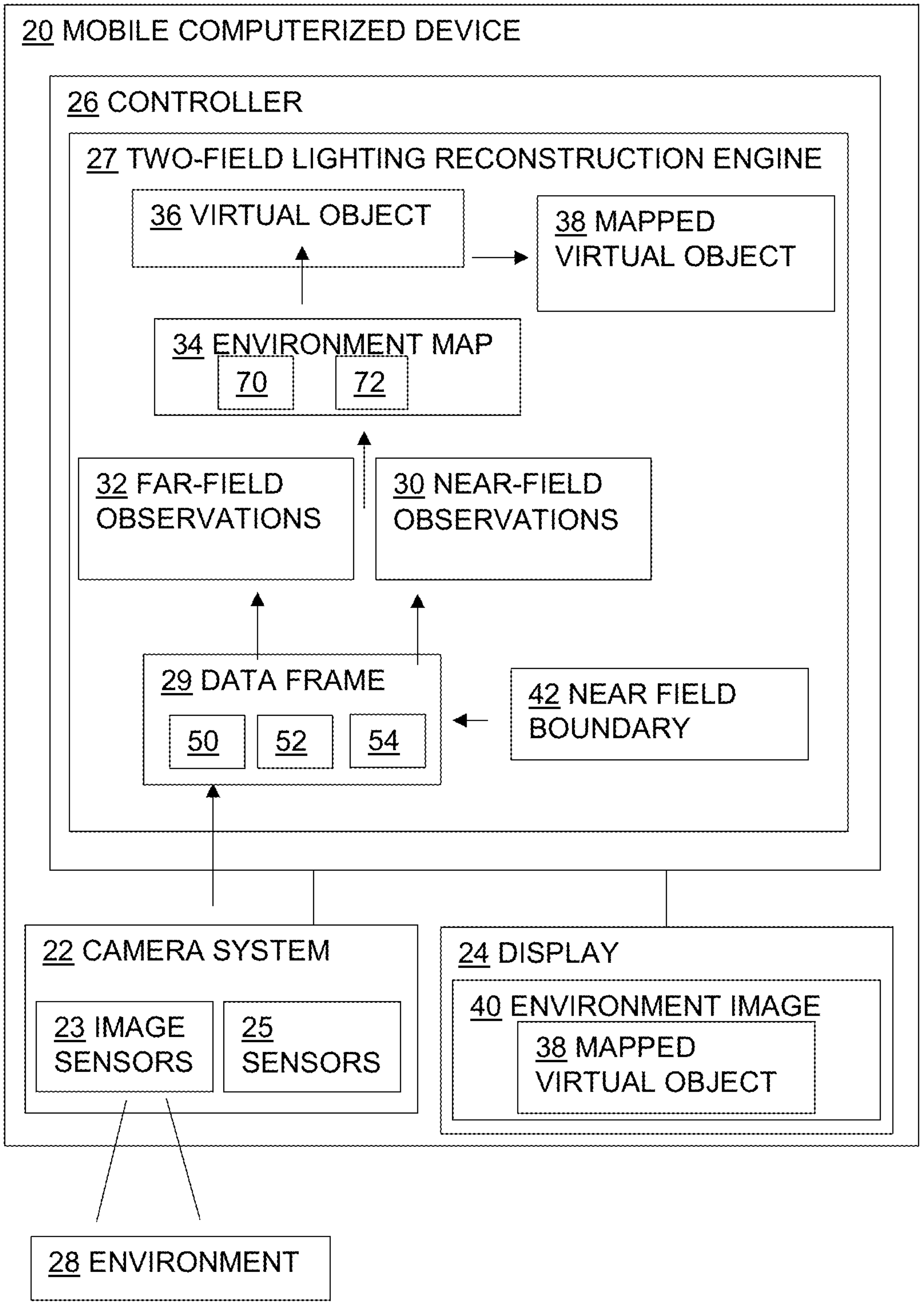
FIG. 1 illustrates a schematic representation of a mobile computerized device configured to generate visually coherent lighting for a virtual object in mobile augmented reality, according to one arrangement.

FIG. 1 illustrates a schematic representation of a mobile computerized device 20 configured to generate visually coherent lighting for a virtual object in mobile augmented reality, according to one arrangement. In one arrangement, the mobile computerized device 20 can be configured as a mobile cellular telephone device, such as a smart phone, as a wearable computerized device, such as a smart watch, or as a tablet device. For example, the mobile computerized device 20 can include a display 24 and a camera system 22 having image sensors 23, such as light, color, and depth sensors and one or more sensors 25, such as a motion sensor (e.g., accelerometers) and a position sensor (e.g., gyroscope). Each of the display 24 and camera system 22 are disposed in electrical communication with a controller 26, such as a processor and memory.

The controller 26 is configured to execute a two-field lighting reconstruction engine 27 to generate a virtual object rendering in mobile augmented reality (AR) which includes lighting and reflectivity consistent with the lighting of a physical environment. For example, in certain cases, a user may want to view how a physical object, such as a table to be purchased, would look in a particular real-world environment, such as in the user's living room, as part of a mobile AR application. However, lighting can be both spatially and temporally varying and rendering virtual objects using conventional lighting information from locations other than the rendering position can lead to visual degradation. Accordingly, the user can utilize the two-field lighting reconstruction engine 27 of the mobile computerized device 20 to provide a relatively high-quality rendering of the virtual object having structurally similar reflections of the physical object within the real-world environment.

Figure 2:
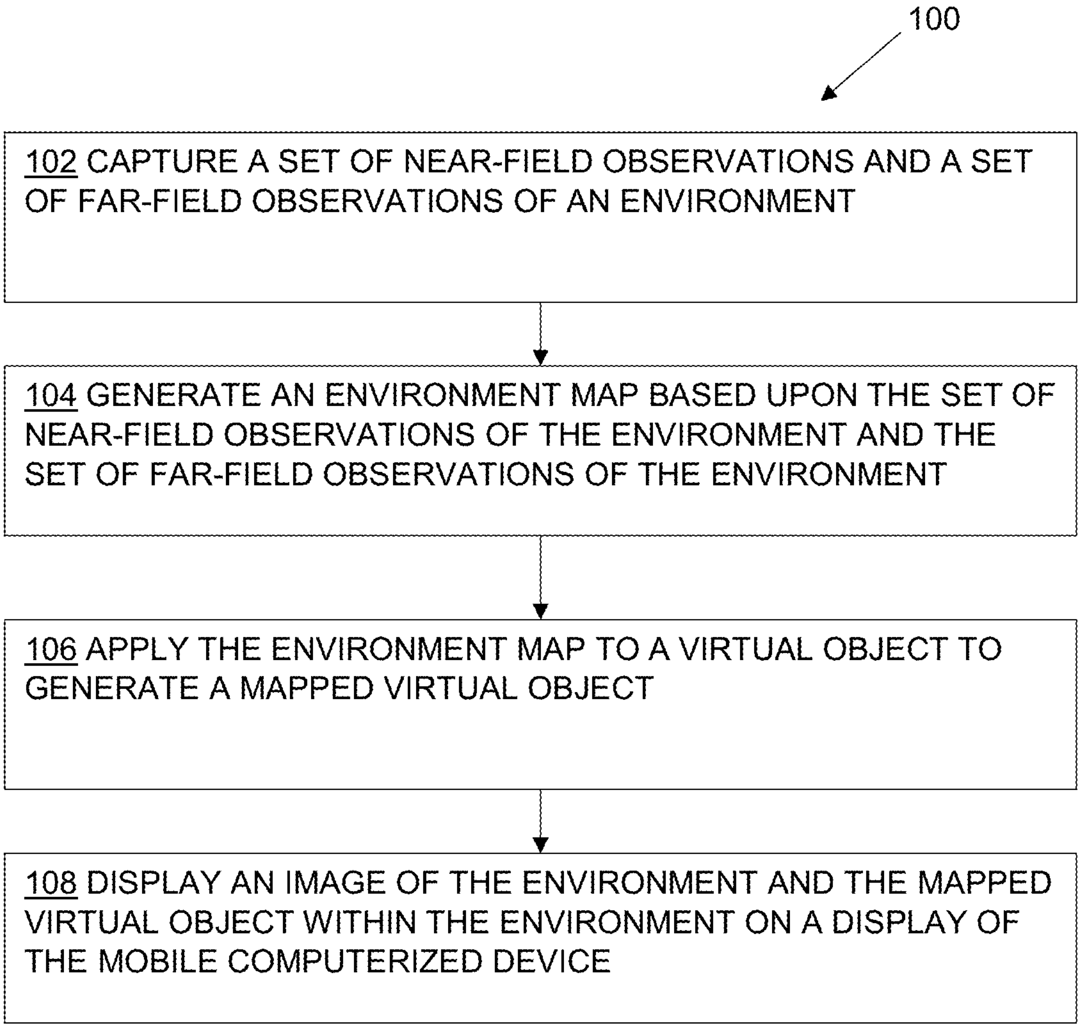
FIG. 2 is a flowchart showing a method performed by the mobile computerized device when generating visually coherent lighting for mobile augmented reality, according to one arrangement.

FIG. 2 is a flowchart 100 illustrating a method performed by the mobile computerized device 20 when generating visually coherent lighting for mobile augmented reality.

In element 102, the mobile computerized device 20 captures a set of near-field observations 30 and a set of far-field observations 32 of an environment 28. In one arrangement, with reference to FIG. 1, with execution of the two-field lighting reconstruction engine 27, the mobile computerized device 20 can capture data frames 29, including color image data 50, depth image data 52, and device position data 54 (e.g., X, Y, Z position in a Cartesian coordinate system), related to the environment 28. For example, with additional reference to FIG. 3, during operation, the user positions the mobile computerized device 20 at position $P_{t1}$ within a given space and points toward the environment 28 of interest. With execution of the two-field lighting reconstruction engine 27, the mobile computerized device 20 captures, via the camera system 22, color image data 50-1 and depth image data 52-1, as well as device position data 54-1, via the position sensor 25, as data frame 29-1 at position $P_{t1}$. The user then manually moves the position of the mobile computerized device 20 within the space and relative to the environment 28. For example, following movement of the mobile computerized device 20 to position $P_{t2}$, the controller 26 receives color image data 50-2, depth image data 52-2, and device position data 54-2 from the viewing direction at position $P_{t2}$ as data frame 29-2, which overlaps with the data captured at $P_{t1}$.

Conventional mobile computerized device cameras can be configured with a relatively small field-of-view and thus capture only a small portion of the environment covering limited directions. Further, objects in a far-field environment may exceed the range limit of the depth sensors of the mobile computerized device, which makes it difficult to obtain geometrically accurate transformation. As such, as the controller 26 receives the captured data frames 29, the controller 26 is configured to utilize a near field boundary 42 to identify portions of each data frame 29 either as a near-field observation 30 where the lighting reconstruction position falls within the field-of-view of the camera system 22 or as a far-field observation 32 where the lighting reconstruction position falls outside of the field-of-view of the camera system 22.

In one arrangement, the near-field boundary 42 can be defined as a constrained cubic space that contains points belonging to the near-field observations 30. For example, the near-field boundary 42 can have a side-length of about two meters. When applying a near field boundary to a data frame 29, the controller 26 is configured to define a portion of the data frame 29 within the near field boundary 42 as a near-field observation element 30 and defining a portion of the data frame 29 outside the near field boundary as a far-field observation element 32. By separating the data frames 29 into near-field observations 30 and far-field observations 32, the mobile computerized device 20 is configured to generate both relatively high-quality lighting reconstruction by utilizing associated depth information 52 as provided by the from near-field observations 30 and relatively low-detail lighting reconstruction as provided from the far-field observations 32.

Returning to FIG. 2, in element 104, the mobile computerized device 20 generates an environment map 34 based upon the set of near-field observations 30 of the environment 28 and the set of far-field observations 32 of the environment 28. For example, as will be described in detail below, the controller 26 is configured to convert the near-filed observations 30 into a dense point cloud 70 and to convert the far-field observations 32 into a sparse point cloud 72. The controller 26 is configured to then combine the dense point cloud 70 and sparse point cloud 72 into the environment map 34 which represents the lighting associated with the environment 28.

In element 106, the mobile computerized device 20 applies the environment map 34 to a virtual object 36 to render a visually-coherent virtual object 38. For example, assume the case where the virtual object 36 represents a table. The controller 26 can apply the lighting represented by the environment map 34 onto the surface of the table to generate, as the visually-coherent virtual object 38, a table that includes lighting and reflective surfaces corresponding to the lighting in the physical environment 28. Next, in element 108, the mobile computerized device 20 displays an image of the environment 28 and the visually-coherent virtual object 38 within the environment 28 on the display 24. With such a display, the mobile computerized device 20 provides the user with the image of the table as it would look in the user's real-world environment as part of a mobile AR.

With such a configuration, by utilizing both near-field and far-field lighting, the mobile computerized device 20 is configured to transform camera observations of an environment 28 into lighting information to produce an accurate display of a virtual object 36 in augmented reality. The two-field lighting reconstruction approach provides accurate lighting information and achieves visual results without requiring expensive data collection, model training, or physical setup.

As provided above, the mobile computerized device 20 is configured to generate an environment map 34 based upon the set of near-field observations 30 of the environment 28 and the set of far-field observations 32 of the environment 28. In one arrangement, the mobile computerized device 20 is configured to separately process the near-field observations 30 and the far-field observations 32 to generate the multi-resolution environment map 34. For example, the mobile computerized device 20 is configured to execute two branches of the two-field lighting reconstruction engine 27 to generate a multi-view dense point cloud 74 and a fixed-size point cloud 80. This two-branch design can reduce the computational cost and memory consumption of the mobile computerized device 20.

Figure 4:
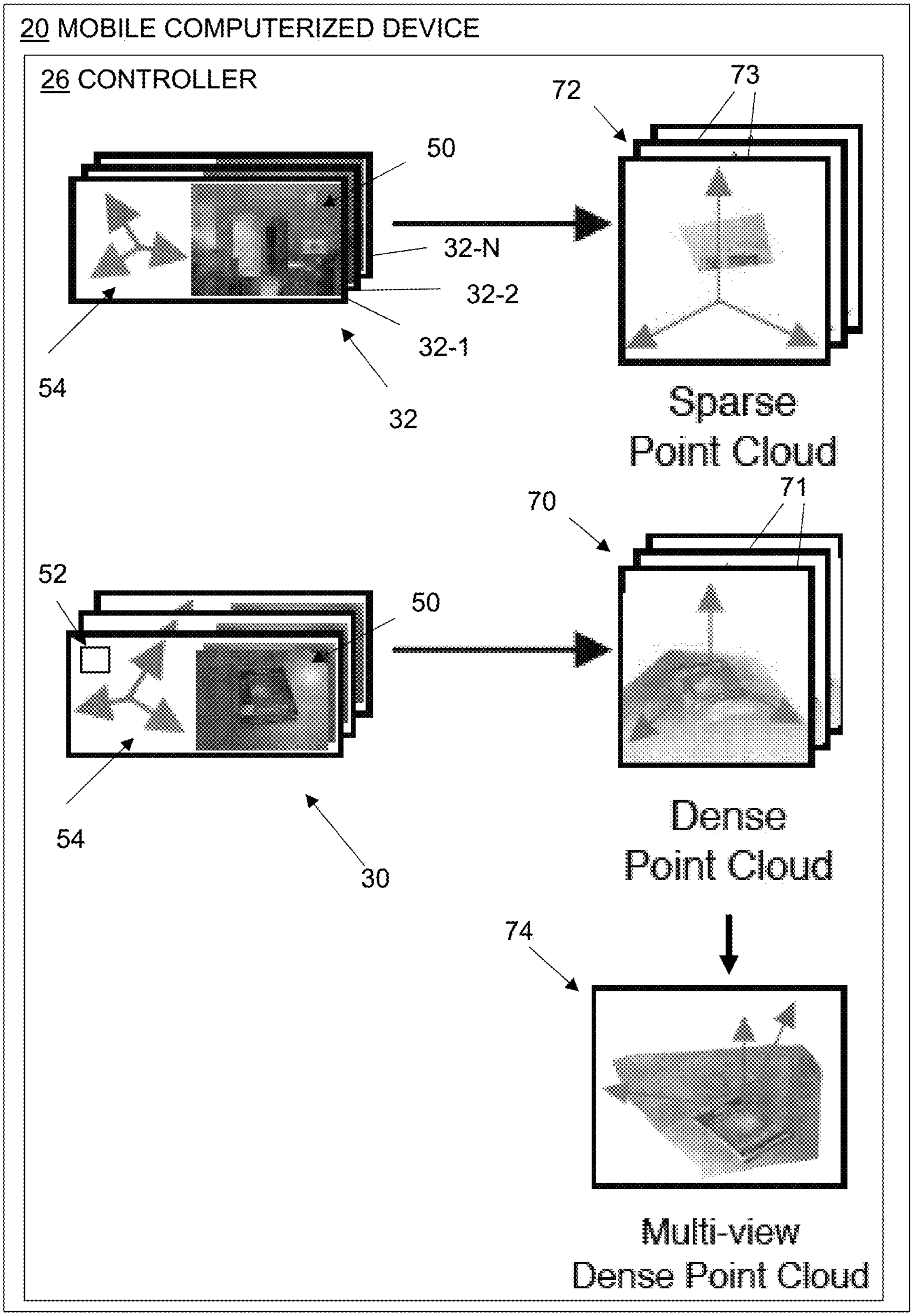
FIG. 4 illustrates a schematic representation of a mobile computerized device configured to generate a multi-view dense point cloud and a sparse point cloud, according to one arrangement.

FIG. 4 illustrates a process performed by the mobile computerized device 20 when generating the multi-view dense point cloud 74. The multi-view dense point cloud 74 represents near-field observations and corresponds to the portion of the environment map 34 that receives relatively more accurate and higher confidence depth information surrounding the rendering position.

During operation, for each near-field observation 30, the controller 26 is configured to identify the depth image data 52 and the color image data 50 for each data point of the near-field observation 30. For example, the controller 26 can perform a dense sampling of the depth image data 52 and the color image data 50 of each data point within the near-field observation 30 associated with a data frame 29. Next, the controller 30 is configured to apply the device position data 54 of the near-field observation 30 to the depth image data 52 and the color image data 50 for each data point to construct a dense point cloud element 71. For example, as provided above, the device position data 54 can relate to the X, Y, Z Cartesian coordinate system position of the mobile computerized device 20 relative to a target imaging position within the environment 28 (e.g., device tracking data generated by the motion and/or position sensors 25 of the camera system 22). As such, by applying the device position data 54 to the depth image data 52 and the color image data 50 of each data point within the near-field observation 30, the controller 26 provides the depth image data 52 and the color image data 50 with positioning information within the dense point cloud element 71, relative to the environment 28, for each near-field observation 30.

In one arrangement, the controller 26 is configured to aggregate the dense point cloud element 71 of each near-field observation to generate a multi-view dense point cloud 74 associated with the environment 28. The multi-view dense point cloud 74 represents the detailed three-dimensional lighting of the target imaging position within the environment 28.

When generating the fixed-size point cloud 80, as illustrated in FIG. 4, the mobile computerized device 20 is configured to first generate a sparse point cloud 72. The sparse point cloud 74 provides lighting information of an environment 28 which relates to the far-field observations 32 associated with the captured data frames 29 of the environment 28.

During operation, for each far-field observation 32, the controller 26 is configured to identify the color image data 50 for each data point of the far-field observation 32. For example, the controller 26 can perform a relatively sparse sampling of the color image data 50 of each data point within the far-field observation 32 as associated with each data frame 29. As provide above, a data frame 29, or a portion of a data frame 29, is defined as a far-field observation 32 when the lighting reconstruction position falls outside of the field-of-view of the camera system 22. As such, since the sparse point cloud 72 corresponds to the portion of the environment map 34 that receives relatively little, if any, depth information surrounding the rendering position, the controller 26 is configured to ignore any depth image data for a far-field observation 32 as its depth information may be inaccurate and the spatial variance has less impact on the sparse point cloud 74. Rather, the controller 26 is configured to set a uniform depth image data value, such as a value of one, to each data point within the far-field observation 32 associated with each of the data frames 29.

Next, the controller 30 is configured to apply device position data 54 of the far-field observation 32 to the color image data 50 for each data point to construct sparse point cloud elements 73. For example, as provided above, the device position data 54 can relate to the X, Y, Z Cartesian coordinate system position of the mobile computerized device 20 relative to a target imaging position within the environment 28 (e.g., device tracking data). As such, by applying the device position data 54 to the color image data 50 of each data point within the far-field observation 32, the controller 26 provides the color image data 50 with positioning information within the sparse point cloud element 73, relative to the environment 28, for each far-field observation 32.

Figure 5:
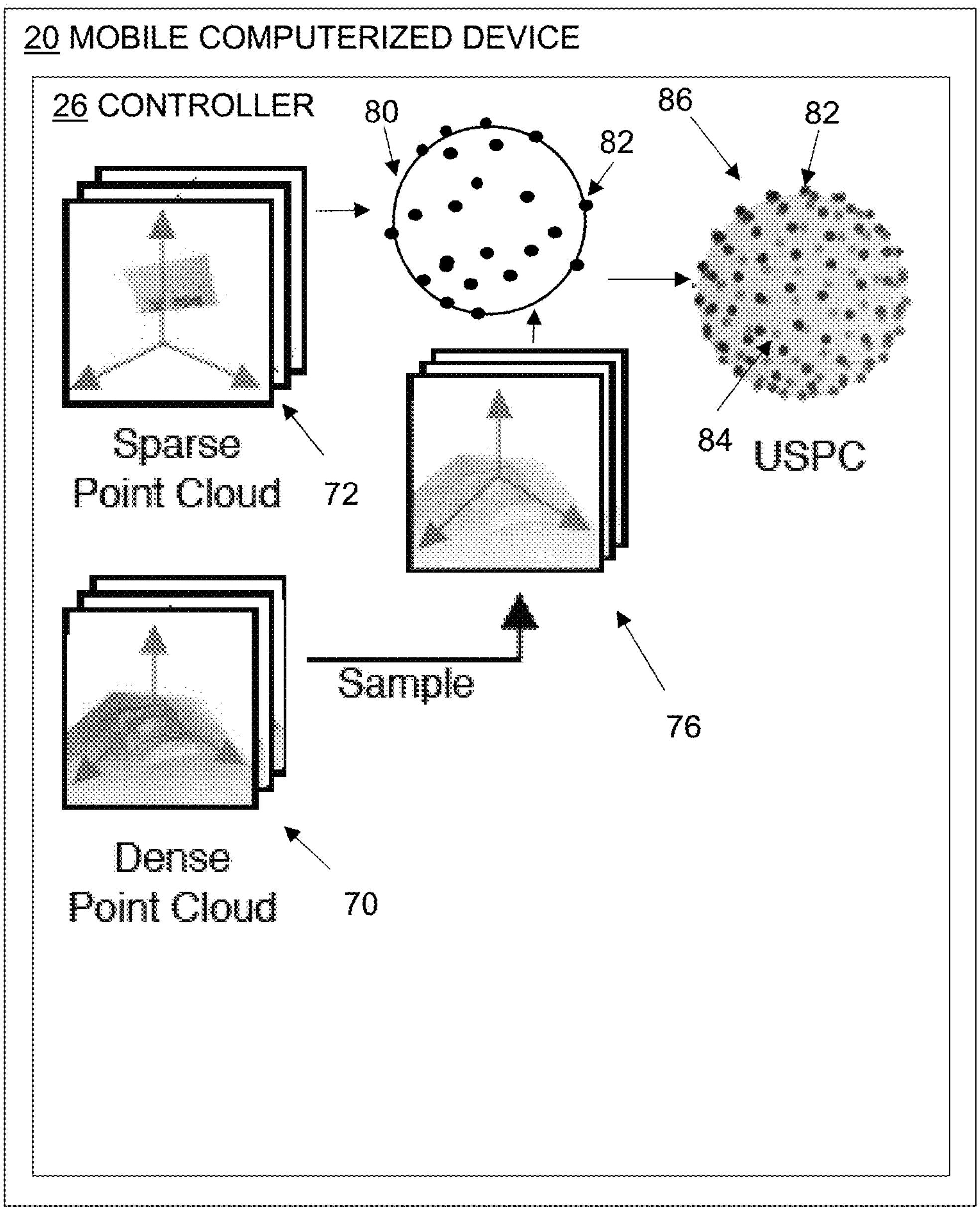
FIG. 5 illustrates a schematic representation of a mobile computerized device configured to generate a unit-sphere point cloud, according to one arrangement.
Figure 6:
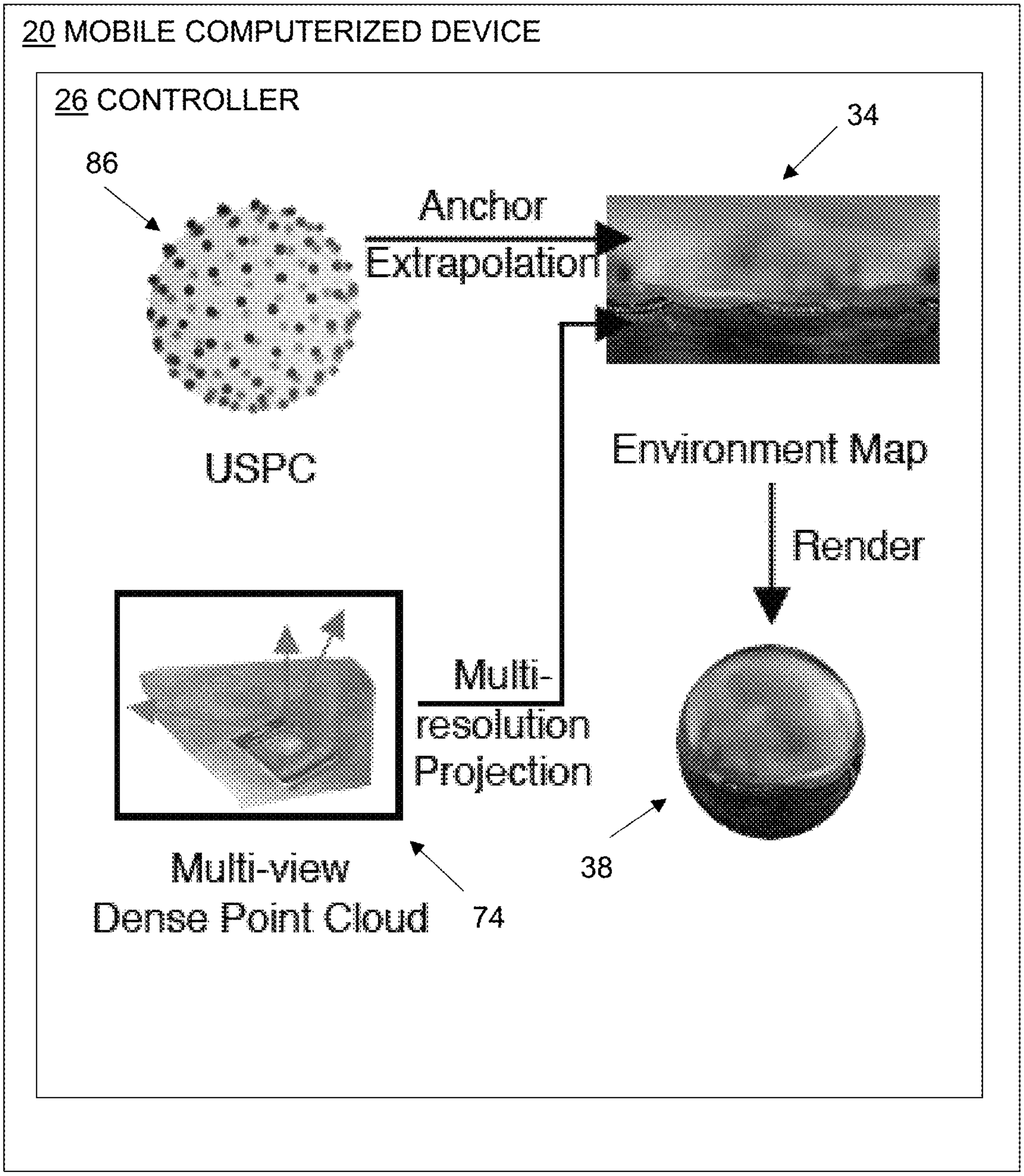
FIG. 6 illustrates a schematic representation of a mobile computerized device configured to generate an environment map, according to one arrangement.

Following generation of the multi-view dense point cloud 74 and the sparse point cloud 72, the mobile computerized device 20 is further configured to utilize the multi-view dense point cloud 74 and sparse point cloud 72 to generate an environment map 34. FIGS. 5 and 6 illustrate an arrangement of this process.

First, the mobile computerized device 20 utilizes the multi-view dense point cloud 74 and the sparse point cloud 72 to generate a unit-sphere point cloud 86, as illustrated in FIG. 5. In one arrangement, the controller 26 projects each sparse point cloud element 73 onto a set of anchor points 82 on a unit sphere 80. While the unit sphere 80 can have any number of anchor points 82, in one arrangement, the number of anchor points 82 can be set to 1280. The controller 26 is configured to set a color of each anchor point 82 as the color image data 50 of the points within the sparse point cloud element 73.

In order to generate a unit-sphere point cloud 86 that represents lighting from all directions, the controller 26 is configured to include lighting information associated near-field observations 30. As such, the controller 26 samples each dense point cloud element 71 associated with the near-field observation 30, such as through a process of sparse sampling, to generate a set of sampled point clouds 76. Next, the controller 26 applies each sampled point cloud of the set of sampled point clouds 76 onto the unit sphere 80 as a set of sampled distributed points 84 to generate a unit-sphere point cloud 86 associated with the environment 28. Accordingly, the resulting unit-sphere point cloud 86 represents lighting within the environment 28 from all directions, including near-field observations 30, and therefore addresses the anisotropy property of environmental lighting. Further, the unit-sphere point cloud 86 utilizes a relatively small memory footprint, proportional to anchor size, while providing sufficient directional-aware lighting information.

Figure 7:
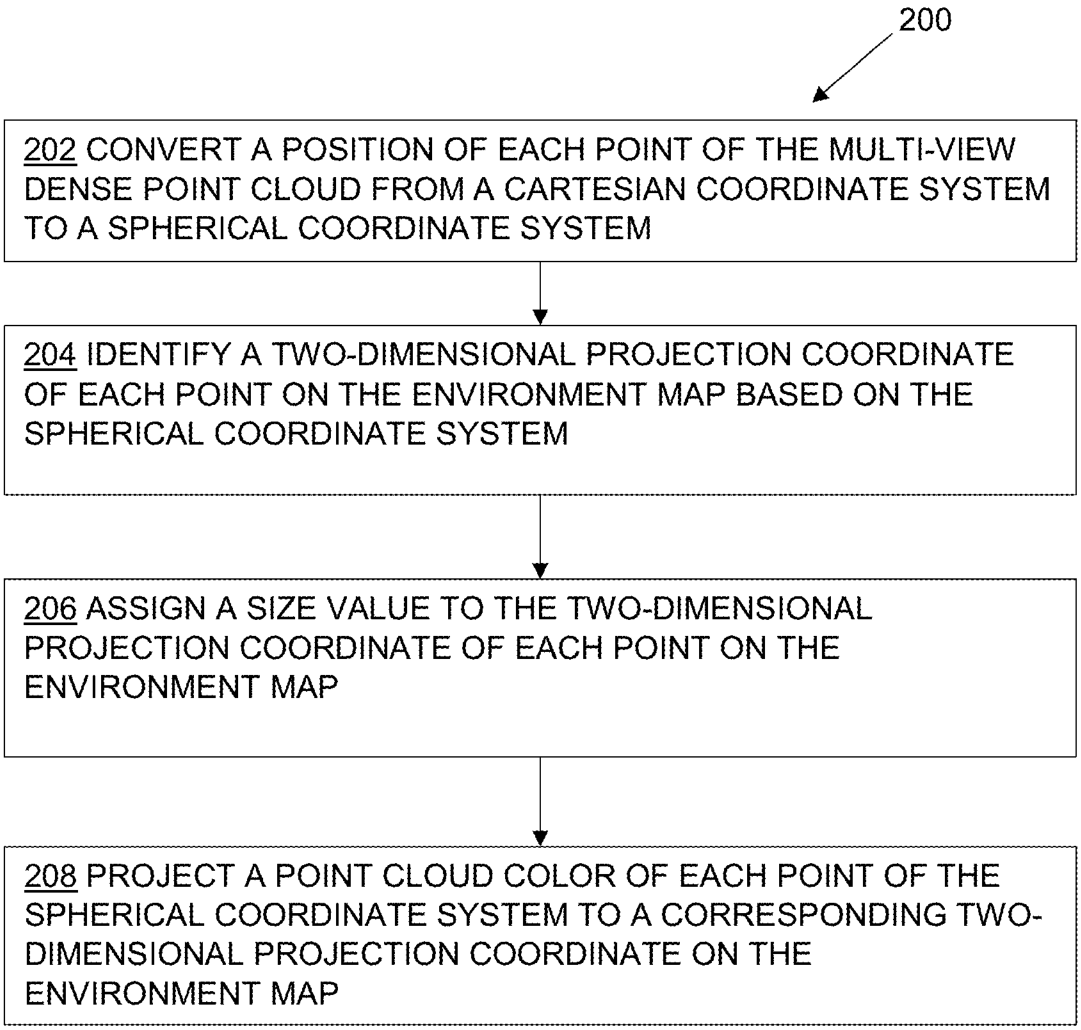
FIG. 7 is a flowchart showing a method performed by the mobile computerized device when performing a multi-resolution projection on a multi-view dense point cloud, according to one arrangement.
Figure 8:
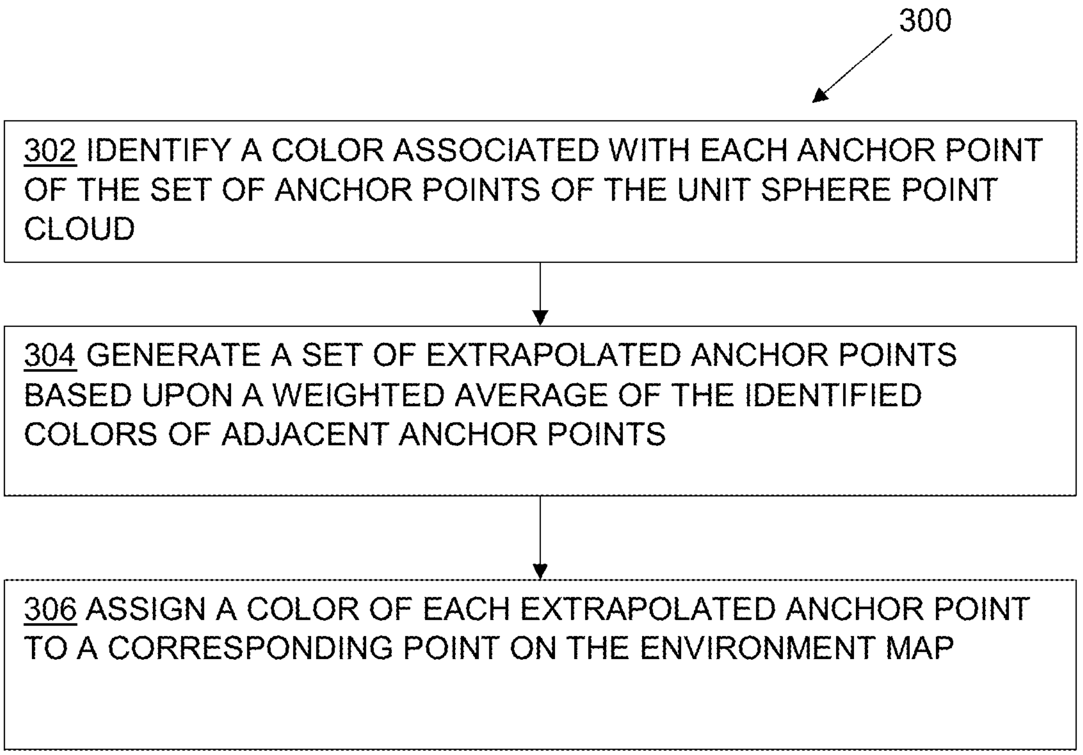
FIG. 8 is a flowchart showing a method performed by the mobile computerized device when performing an anchor extrapolation on the unit-sphere point cloud, according to one arrangement.

Following generation of the unit-sphere point cloud 86, the controller 26 is configured to utilize both the unit-sphere point cloud 86 and the multi-view dense point cloud 74 to generate the environment map 34. FIGS. 6-8 illustrate a process performed by the mobile computerized device 20 when generating the environment map 34.

First, the controller 26 is configured to perform a multi-resolution projection on the multi-view dense point cloud 74 to apply to the environment map 34. For example, during multi-resolution projection and with reference to the flowchart 200 of FIG. 7, in element 202 the controller 26 converts a position of each point of the multi-view dense point cloud 74 from a Cartesian coordinate system to a spherical coordinate system. Next, in element 204, the controller 26 identifies a two-dimensional projection coordinate of each point on the environment map 34 based on the spherical coordinate system. For example, the controller 26 can calculate the two-dimensional projection coordinate on the environment map 34 based on the angle values of the spherical coordinates of each point. Next in element 208, the controller 26 projects a point cloud color of each point of the spherical coordinate system to a corresponding two-dimensional projection coordinate on the environment map 34. Multi-resolution projection is a lightweight technique utilized by the mobile computerized device 20 to efficiently convert the multi-view dense point cloud 74 into a relatively densely-projected image. Compared to other conventional methods, such as mesh reconstruction for example, multi-resolution projection is well suited for real-time AR applications, as the computation resources used by the mobile computerized device 20 are relatively low.

In one arrangement, the controller 26 can project the point cloud colors to corresponding points on the environment map 34 with decreasing resolutions to address inter-point connection and occlusion at the two-dimensional point or pixel level. For example, during operation the controller 26 can project multiple points from the spherical coordinate system to the same two-dimensional projection coordinate on the environment map 34. However, when the density of the multi-view dense point cloud 74 is relatively low, such as due to low capturing resolution, projecting the multi-view dense point cloud 74 onto one environment map image resolution may lead to degraded visual quality. For example, such projection can generate an environment map 34 showing a series of discretely projected points rather than a continuous view of the environment 28, and it might not adequately represent the inter-point occlusion.

In one arrangement, to address these issues and as shown in element 206 of FIG. 7, the controller 26 is configured to utilize multi-resolution image projection to assigning a size value to the two-dimensional projection coordinate of each point on the environment map 34, such as when projecting the point cloud color of each point of the spherical coordinate system to the corresponding two-dimensional projection coordinate on the environment map 34. For example, the controller 26 is configured to project the point cloud of the spherical coordinate system into a series of images with decreasing resolutions. Next, the controller 26 is configured to scale the projected images to the largest resolution via the nearest pixel interpolation to generate a set of the multi-resolution projection results. Next, the controller 26 is configured to merge the multi-resolution projection results are merged into the environment map 34 by selecting the shortest-distant projected point to the reconstruction position from each projected image per pixel. If multiple projections have the same distance, the controller 26 is configured to select the one from the highest resolution as it has more visual details.

As provided above, the unit-sphere point cloud 86 represents the far-field lighting of the environment 28. In order to generate the far-field lighting of the corresponding environment map 34 in the equirectangular format, the controller 26 can apply the color of each anchor point 82 of the unit-sphere point cloud 86 to a corresponding two-dimensional projection coordinate or pixel on the environment map 34. However, as described above, the unit-sphere point cloud 86 can be configured with a fixed number of anchor points 82. Therefore, directly projecting anchor points 82 to the environment map 34 can result in a number two-dimensional projection coordinates or pixels lacking a color value. To address this, the controller 26 is configured to perform an anchor extrapolation on the unit-sphere point cloud 86 to assign each two-dimensional projection coordinate on the environment map 34 with a weighted average of adjacent anchor point color values.

In one arrangement, during performance of the anchor extrapolation on the unit-sphere point cloud 86, and with reference to the flowchart 300 of FIG. 8, in element 302 the controller 26 identifies a color associated with each anchor point 82 of the set of anchor points 82 of the unit sphere point cloud 86.

In element 304, the controller 26 generates a set of extrapolated anchor points based upon a weighted average of the identified colors of adjacent anchor points 82. For example, the controller 26 is configured to initialize each pixel of the environment map 34 with a normal vector, such as a unit vector from a sphere center location of the environmental map 34 to the pixel position. The initialization is feasible, as a pixel in the equirectangular format of an environment map 34 can be presented in the spherical coordinate system. The controller 26 is configured to then calculate the $i^{th}$ pixel color $c_i$ of the anchor points 82 of the unit sphere point cloud 86 using the following equation:

$$c_i = \frac{2}{N}\sum_{j=1}^{N}\max(\vec{p_j}\cdot\vec{n_i}, 0)^w c_j$$

where $\vec{n_1}$ represents the pixel normal vector, N is the number of anchors, $\vec{p_j}$ and $c_j$ are the normal vector and color for the j-th anchor, respectively. It is noted that the dot product between $\vec{p_j}\cdot\vec{n_1}$ is effectively the cosine value of the angle between these vectors, as $|\vec{p_j}|=|\vec{n_1}|=1$. The max function is configured to filter the anchor points in the hemisphere opposite the $i^{th}$ pixel. Furthermore, w is an exponent controlling the blurring level of far-field reconstruction. Intuitively, a smaller w value can lead to more anchor points used for the pixel calculation. Thus, a smaller w value can result in a blurrier environment map, while a larger w will produce a relatively clearer environment map 34.

In element 306, the controller 34 assigns a color of each extrapolated anchor point to a corresponding point on the environment map 34. Such assignment results in a gradient coloring and blurring effect in the environmental map 34.

Note that calculating the pixel color using the above equation can be time-consuming to the controller 26 as the controller 26 has to iterate through all anchor points to generate the weighted average. However, all anchor points do not contribute equally to the pixel color calculation. Therefore, an anchor point j that has a smaller $\max(\vec{p_j}\cdot\vec{n_1},0)$ decreases faster with the power w. Such anchor points are also farther away from a pixel of interest on the environment map 34 than anchor points with a larger $\max(\vec{p_j}\cdot\vec{n_1},0)$ value. For example, when w=128, only the 32 nearest anchor points out of the 1280 anchor points on the unit sphere point cloud 86 contribute significantly (i.e., $\max(\vec{p_j}\cdot\vec{n_1},0)>0.1$). Therefore to speed up the pixel color calculation, the controller 26 is configured to precompute the thirty-two nearest anchor points for each pixel on the environment map 34, along with their respective cosine values. The precomputation effectively reduces the number of anchor points by a factor of 40 with negligible impact of the visual results and allows the use of cached results for the weighted average calculation.

Figure 3:
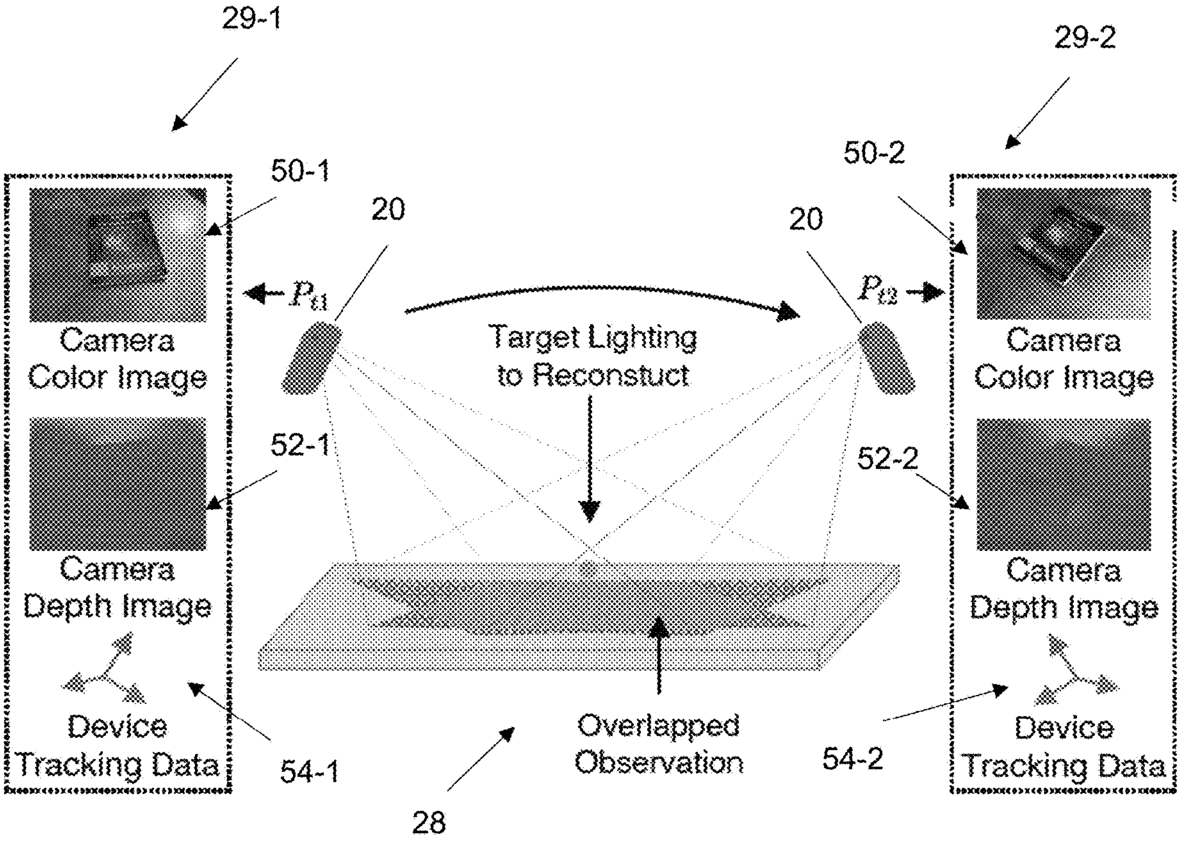
FIG. 3 illustrates a schematic representation of the mobile computerized device configured to capture image frames, according to one arrangement.

As indicated above, with reference to FIG. 3, in order to develop an environmental map 34, the mobile computerized device 20 captures a series of data frames 29 of an environment 28 of interest while the user moves the mobile computerized device 20 within the environment 28, such as between position $P_{t1}$ and position $P_{t2}$. However, continuous capturing of a relatively large number of data frames 29 between position $P_{t1}$ and position $P_{t2}$ or relying on the user to manually capture these data frames 29 can lead to poor usability, low-quality data (e.g., images with motion blur), and high consumption of mobile computerized device resources.

In one arrangement, in order to capture high-quality data frames 29 and to mitigate resource consumption by the mobile computerized device 20, the controller 26 is configured to capture a data frame 29 that is new spatially (e.g., by checking mobile computerized device 20 position and rotation information) and temporally (e.g., by updating a previously captured data frame 29 with the same information). For example, as provided below, the controller 26 is configured to execute a timer-based policy to assess the need to capture new data frames 29 by checking if the mobile computerized device 20 has exhibited significant movement within the environment 28.

Figure 9:
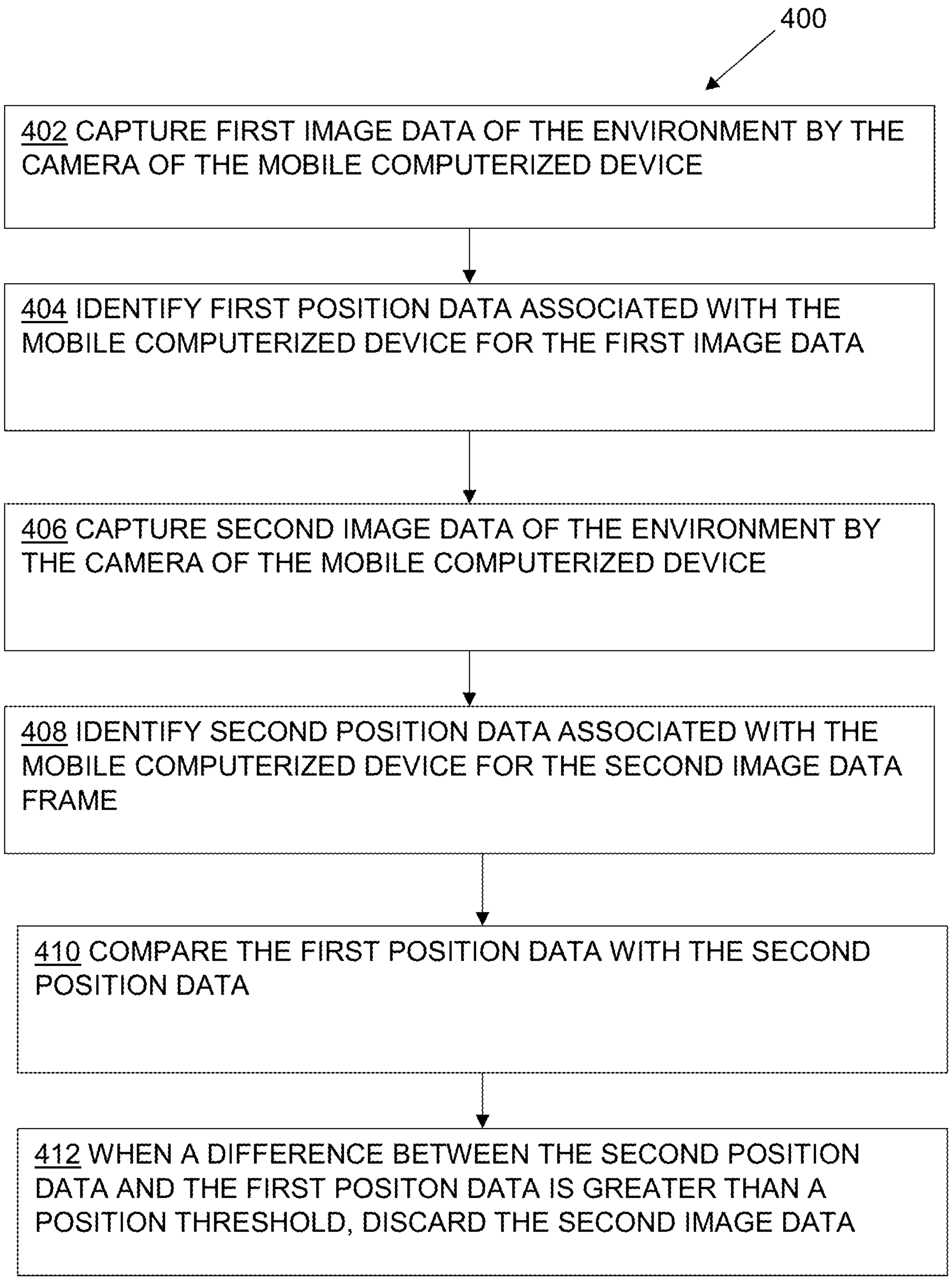
FIG. 9 is a flowchart showing a method performed by the mobile computerized device when capturing data frames of the environment, according to one arrangement.

With reference to the flowchart 400 in FIG. 9, at element 402 the mobile computerized device 20 captures first data frame 29-1 of the environment 28 by the camera system 22 of the mobile computerized device 20. For example, with additional reference to FIG. 3, during operation, the user positions the mobile computerized device 20 at position $P_{t1}$ and points toward the environment 28 of interest. With execution of the two-field lighting reconstruction engine 27, the controller 26 receives, via the camera system 22, color image data 50-1 and depth image data 52-1, as well as device position data 54-1, via the position sensor 25, as a first data frame 29-1 at position $P_{t1}$. Further, at element 404, the controller 26 identifies first position data, such as device position data 54-1, associated with the mobile computerized device 20 for the first data frame 29-1.

Next, at element 406, the mobile computerized device 20 captures a second data frame 29-2 of the environment 28 by the camera system 22 of the mobile computerized device 20. For example, after a given amount of time (e.g., every C milliseconds), the controller 26 receives the second data frame 29-2, such as color image data 50-2, depth image data 52-2, and device position data 54-2 from the viewing direction at position $P_{t2}$. Further, at element 408, the controller 26 identifies second position data 54-2 associated with the mobile computerized device 20 of the second data frame 29-2.

Next, at element 410, the mobile computerized device 20 compares the first position data 54-1 with the second position data 54-2. For example, by comparing the position data 54-1 (e.g., the six degree of freedom data provided by the mobile computerized device 20 accelerometer and gyroscope sensors) of the first data frame 29-1, to the position data 54-2 in the moving window, the controller 26 can assess the likelihood of motion blur. At element 412, when a difference between the second position data 54-2 and the first positon data 54-1 is greater than a position threshold, the controller 26 discards the second data frame 29-2. For example, if the position of the mobile computerized device 20 has changed by more than 10 cm and 10° (e.g., the position threshold), from position $P_{t1}$ to position $P_{t2}$, the mobile computerized device 20 can be considered to have significant movement in a relatively short time window. As such, to mitigate blur in the data frames 29 captured, the controller 26 can skip or discard the second data frame 29-2. The controller 26 is configured to assess the change in position of the mobile computerized device 20 second data frames 29-2 until a new data frame 29 is received while the mobile computerized device 20 is relatively stable. Otherwise, if the difference between the second position data 54-2 and the first positon data 54-1 falls within the position threshold, the controller 26 is configured to retain the second data frame 29-2.

As provided above, the camera system 22 associated with the mobile computerized device 20 is configured to obtain both near-field observations 30 and far-field observations 32 from each data frame 29. Such description is by way of example only. In one arrangement, the mobile computerized device 20 is configured to capture near-field observations 30 using a first, or environment-facing, camera system 22 and to capture far-field observations 32 using a second camera system facing a backward environment, i.e., observable from the opposite direction to the virtual object viewing direction. Such a configuration increases the observation directions to help address anisotropic lighting properties.

While various embodiments of the innovation have been particularly shown and described, it will be understood by those skilled in the art that various changes in form and details may be made therein without departing from the spirit and scope of the innovation as defined by the appended claims.

What is claimed is:

1. In a mobile computerized device, a method for generating visually coherent lighting for mobile augmented reality, comprising:
- capturing a set of near-field observations and a set of far-field observations of an environment, comprising:
  - capturing a data frame of the environment by a camera system of the mobile computerized device;
  - applying a near field boundary to the data frame;
  - defining a portion of the data frame within the near field boundary as a near-field observation when a lighting reconstruction position falls within the field-of-view of the camera system; and
  - defining a portion of the data frame outside the near field boundary as a far-field observation when the lighting reconstruction position falls outside of the field-of-view of the camera system;
- generating an environment map based upon the set of near-field observations of the environment and the set of far-field observations of the environment, the environmental map representing lighting of the environment;
- applying the environment map to a virtual object to render a visually-coherent virtual object in the mobile augmented reality, the visually-coherent virtual object comprising lighting corresponding to the lighting of the environment, the visually-coherent virtual object comprising a reflective surface of the virtual object in the mobile augmented reality corresponding to the lighting of the environment; and
- displaying an image of the environment and the visually-coherent virtual object within the environment in the mobile augmented reality on a display of the mobile computerized device.

2. The method of claim 1, wherein capturing the data frame of the environment by the camera system of the mobile computerized device comprises:
- capturing a first data frame of the environment by the camera system of the mobile computerized device;
- identifying first position data associated with the mobile computerized device for the first data frame;
- capturing a second data frame of the environment by the camera system of the mobile computerized device;
- identifying second position data associated with the mobile computerized device for the second data frame;
- comparing the first position data with the second position data; and
- when a difference between the second position data and the first position data is greater than a position threshold, discarding the second data frame.

3. The method of claim 1, comprising:
- for each near-field observation, identifying depth image data and color image data for each data point of the near-field observation; and
- for each near-field observation, applying device position data of the near-field observation to the depth image data and the color image data for each data point to construct a dense point cloud element of the dense point cloud.

4. The method of claim 3, comprising aggregating the dense point cloud element of each near-field observation to generate a multi-view dense point cloud associated with the environment.

5. The method of claim 3, comprising:
- for each far-field observation, identifying color image data for each data point of the far-field observation; and
- for each far-field observation, applying device position data of the far-field observation to the color image data for each data point to construct a sparse point cloud element of the sparse point cloud.

6. The method of claim 5, comprising:
- projecting each sparse point cloud element of the sparse point cloud onto a set of anchor points on a unit sphere;
- sampling each dense point cloud associated with the near-field observation to generate a set of sampled point clouds; and
- applying each sampled point cloud of the set of sampled point clouds onto the unit sphere as a set of sampled distributed points to generate a unit-sphere point cloud associated with the environment.

7. The method of claim 6, wherein generating the environment map based upon the set of near-field observations of the environment and the set of far-field observations of the environment comprises:

performing a multi-resolution projection on a multi-view dense point cloud to apply to the environment map; and performing an anchor extrapolation on the unit-sphere point cloud to apply to the environment map.

8. The method of claim 7, wherein performing the multi-resolution projection on the multi-view dense point cloud comprises:

converting a position of each point of the multi-view dense point cloud from a Cartesian coordinate system to a spherical coordinate system;

identifying a two-dimensional projection coordinate of each point on the environment map based on the spherical coordinate system;

assigning a size value to the two-dimensional projection coordinate of each point on the environment map; and projecting a point cloud color of each point of the spherical coordinate system to the corresponding two-dimensional projection coordinate on the environment map.

9. The method of claim 7, wherein performing the anchor extrapolation on the unit-sphere point cloud comprises:

identifying a color associated with each anchor point of the set of anchor points of the unit sphere point cloud;

generating a set of extrapolated anchor points based upon a weighted average of the identified colors of adjacent anchor points; and assigning a color of each extrapolated anchor point to a corresponding point on the environment map.

10. A mobile computerized device, comprising:

a controller having a processor and a memory;

a camera system disposed in electrical communication with the controller; and a display disposed in electrical communication with the controller;

the controller configured to:

capture a set of near-field observations and a set of far-field observations of an environment, wherein when capturing the set of near-field observations and the set of far-field observations of an environment, the controller is configured to:

capture a data frame of the environment by a camera system of the mobile computerized device;

apply a near field boundary to the data frame;

define a portion of the data frame within the near field boundary as a near-field observation when a lighting reconstruction position falls within the field-of-view of the camera system; and define a portion of the data frame outside the near field boundary as a far-field observation when the lighting reconstruction position falls outside of the field-of-view of the camera system;

generate an environment map based upon the set of near-field observations of the environment and the set of far-field observations of the environment, the environmental map representing lighting of the environment;

apply the environment map to a virtual object to render a visually-coherent virtual object in the mobile augmented reality, the visually-coherent virtual object comprising lighting corresponding to the lighting of the environment, the visually-coherent virtual object comprising a reflective surface of the virtual object in the mobile augmented reality corresponding to the lighting of the environment; and display an image of the environment and the visually-coherent virtual object within the environment in the mobile augmented reality on a display of the mobile computerized device.

11. The mobile computerized device of claim 10, wherein when capturing the data frame of the environment by the camera system of the mobile computerized device, the controller is configured to:

capture a first data frame of the environment by the camera system of the mobile computerized device;

identify first position data associated with the mobile computerized device for the first data frame;

capture a second data frame of the environment by the camera system of the mobile computerized device;

identify second position data associated with the mobile computerized device for the second data frame;

compare the first position data with the second position data; and when a difference between the second position data and the first position data is greater than a position threshold, discard the second data frame.

12. The mobile computerized device of claim 10, wherein the controller is configured to:

for each near-field observation, identify depth image data and color image data for each data point of the near-field observation; and for each near-field observation, apply device position data of the near-field observation to the depth image data and the color image data for each data point to construct a dense point cloud element of the dense point cloud.

13. The mobile computerized device of claim 12, wherein the controller is configured to aggregate the dense point cloud of each near-field observation to generate a multi-view dense point cloud associated with the environment.

14. The mobile computerized device of claim 12, wherein the controller is configured to:

for each far-field observation, identify color image data for each data point of the far-field observation; and for each far-field observation, apply device position data of the far-field observation to the color image data for each data point to construct a sparse point cloud element of the sparse point cloud.

15. The mobile computerized device of claim 14, wherein the controller is configured to:

project each sparse point cloud element of the sparse point cloud onto a set of anchor points on a unit sphere;

sample each dense point cloud associated with the near-field observation to generate a set of sampled point clouds; and apply each sampled point cloud of the set of sampled point clouds onto the unit sphere as a set of sampled distributed points to generate a unit-sphere point cloud associated with the environment.

16. The mobile computerized device of claim 15, wherein when generating the environment map based upon the set of near-field observations of the environment and the set of far-field observations of the environment, the controller is configured to:

perform a multi-resolution projection on a multi-view dense point cloud to apply to the environment map; and perform an anchor extrapolation on the unit-sphere point cloud to apply to the environment map.

17. The mobile computerized device of claim 16, wherein when performing the multi-resolution projection on the multi-view dense point cloud, the controller is configured to:

convert a position of each point of the multi-view dense point cloud from a Cartesian coordinate system to a spherical coordinate system;

identify a two-dimensional projection coordinate of each point on the environment map based on the spherical coordinate system;

assign a size value to the two-dimensional projection coordinate of each point on the environment map; and project a point cloud color of each point of the spherical coordinate system to a corresponding two-dimensional projection coordinate on the environment map.

18. The mobile computerized device of claim 16, wherein when performing the anchor extrapolation on the unit-sphere point cloud, the controller is configured to:

identify a color associated with each anchor point of the set of anchor points of the unit sphere point cloud;

generate a set of extrapolated anchor points based upon a weighted average of the identified colors of adjacent anchor points; and assign a color of each extrapolated anchor point to a corresponding point on the environment map.

* * * * *